US 8,304,672 B2
Nov. 6, 2012

(12) United States Patent
Lee et al.

(54) WIRELESS REMOTE RACKING MECHANISM

(75) Inventors: Gregory B. Lee, Elgin, SC (US); Christopher K. Goble, Chapin, SC (US)

(73) Assignee: Schneider Electric USA, Inc., Palatine, IL (US)

( * ) Notice: Subject to any disclaimer, the term of this patent is extended or adjusted under 35 U.S.C. 154(b) by 422 days.

(21) Appl. No.: 12/643,497

(22) Filed: Dec. 21, 2009

(65) Prior Publication Data
US 2011/0147173 A1    Jun. 23, 2011

(51) Int. Cl.
*H01H 9/20* (2006.01)
(52) U.S. Cl. .................................... 200/50.25
(58) Field of Classification Search .... 200/50.17–50.26, 200/50.01, 400, 401, 500, 501, 308, 43.04, 200/43.08, 43.14
See application file for complete search history.

(56) References Cited

U.S. PATENT DOCUMENTS

| | | | |
|---|---|---|---|
| 4,693,132 A | | 9/1987 | Buxton et al. |
| 4,768,131 A | * | 8/1988 | Schultz et al. ................ 361/608 |
| 5,142,110 A | * | 8/1992 | Kuehne et al. ................. 218/42 |
| 5,477,017 A | | 12/1995 | Swindler et al. |
| 6,144,002 A | | 11/2000 | Coudert et al. |
| 6,160,228 A | | 12/2000 | Gerbert-Gaillard et al. |
| 6,160,229 A | | 12/2000 | Grelier et al. |
| 6,777,627 B1 | | 8/2004 | Stevenson |
| 6,951,990 B1 | | 10/2005 | Miller |
| 2004/0129546 A1 | * | 7/2004 | Deylitz ......................... 200/501 |
| 2005/0167256 A1 | * | 8/2005 | Ford et al. ..................... 200/400 |
| 2009/0014292 A1 | * | 1/2009 | Lyu ............................. 200/50.26 |
| 2009/0071811 A1 | * | 3/2009 | van Dijk et al. .............. 200/400 |
| 2009/0255791 A1 | * | 10/2009 | Narayanan et al. ......... 200/50.26 |
| 2010/0025204 A1 | * | 2/2010 | Sapuram et al. ........... 200/50.25 |

FOREIGN PATENT DOCUMENTS

| | | |
|---|---|---|
| CN | 2854876 Y | 1/2007 |
| EP | 2015338 A2 | 1/2009 |
| EP | 2133971 A2 | 12/2009 |

OTHER PUBLICATIONS

Written Opinion corresponding to International Patent Application No. PCT/US2010/059421, European Patent Office, dated Jul. 15, 2011, 4 pages.

(Continued)

*Primary Examiner* — Edwin A. Leon
(74) *Attorney, Agent, or Firm* — Nixon Peabody LLP

(57) ABSTRACT

A motorized racking mechanism for racking a circuit breaker into and out of switchgear/board equipment allows for breaker service without operator proximity to the switchgear. A motor fixed to a cradle that receives a circuit breaker is coupled to a power transmission system that turns a control screw. The control screw laterally moves a crown-wheel device that causes the circuit breaker to be moved among a remove, test, and connected positions in response to a button arm being depressed via a front panel of the cradle. The button arm can be depressed under wireless remote control. A solenoid is coupled to a crank detent actuator that includes the button arm, and a wireless module actuates the solenoid, which moves the button arm, causing the motorized movement of the circuit breaker as if the button arm had been manually depressed. Indicator lights are visible on the front panel to indicate the position of the circuit breaker relative to the cradle.

27 Claims, 13 Drawing Sheets

OTHER PUBLICATIONS

International Search Report corresponding to International Patent Application No. PCT/US2010/059421, European Patent Office, dated Jul. 15, 2011, 4 pages.
CBS Arc Safe Remote Racking Systems for Circuit Breakers, http://www.remoterackingsolutions.com, 2008 (1 page).
Exploring Switchgear Maintenance Options, Steve Vining, Square D Services, West Chester, OH, Plant Engineering, Feb. 2001 (2 pages).
Retro- and Upgrade Services, Remote Racking Systems for Medium Voltage Circuit Breakers, 2003 Schneider Electric (1 page).
Masterpact® NT and NW Universal Power Circuit Breakers, Class 0613, Catalog 0613CT0001R4/08 2008, Schneider Electric, Apr. 2008 (184 pages).
Masterpact® NW Low-Voltage Power/Insulated Case Circuit Breaker Instruction Bulletin 48049-106-09, Doc No. 0613EP0802, Schneider Electric, Jun. 2009 (97 pages).

* cited by examiner

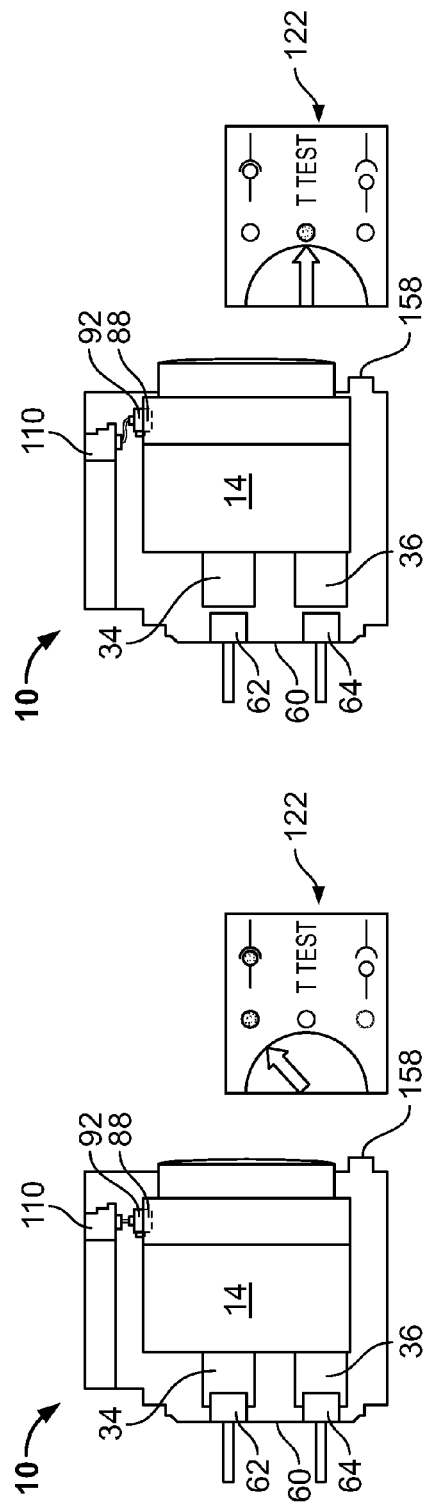
FIG. 2A
FIG. 2B
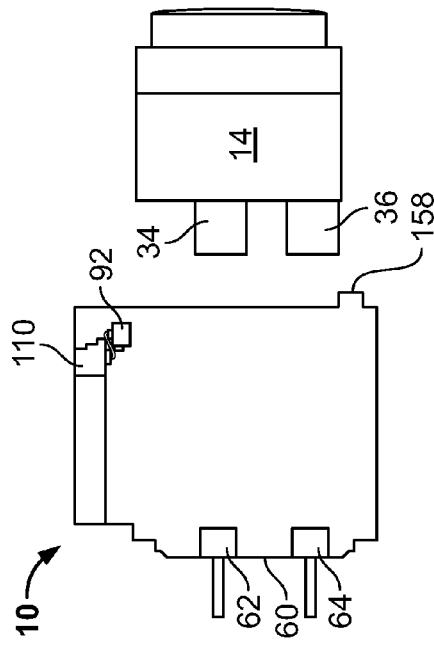
FIG. 2C
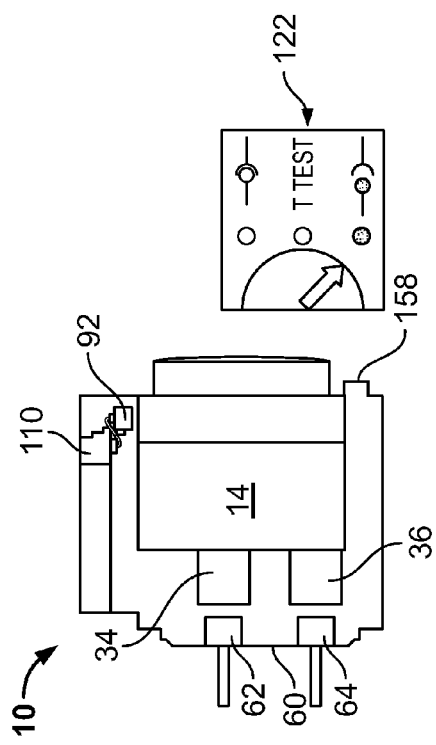
FIG. 2D

WIRELESS REMOTE RACKING MECHANISM

FIELD OF THE INVENTION

The present disclosure relates to racking mechanisms for electrical switchgear/board equipment, and, more particularly, to a motorized internal racking mechanism with wireless control for electrical switchgear/board equipment.

BACKGROUND

Electrical switchgear/board equipment (sometimes just called switchgear or switchboard) house very large and heavy circuit breakers that protect loads that can consume thousands of amps of current. The procedure for making or breaking the electrical connections inside the electrical equipment between primary connectors in the circuit breaker and secondary connectors in the switchgear is referred to as racking. Racking such high-capacity circuit breakers is a procedure wrought with personal danger to the operator's safety. A possibility always exists that an explosion will occur due to a fault creating an arc flash, causing significant injury, including burns, or even death to the operator. Existing techniques have attempted to keep the operator a distance away from the circuit breaker while racking it into or out of the switchgear/board equipment; however, the operator is still required to be present in the same room and sometimes remain in close proximity to the circuit breaker within the blast range of an arc flash hazard. For example, existing racking systems require the operator to insert a hand crank into a panel of the switchgear/board to rack a circuit breaker into and out of the switchgear/board. This puts the operator right in front of the circuit breaker enclosure. Other existing racking systems use a wheeled platform that is positioned in front of the circuit breaker and its enclosure, but the operator is still required to be in the same room as the switchgear/board equipment to operate the racking mechanism, potentially within the arc flash blast range. Whenever the operator is in the room with energized equipment, cumbersome heavy protective gear must be worn.

BRIEF SUMMARY

A motorized racking mechanism for racking a circuit breaker into and out of a cradle of switchgear/board equipment among remove, test, and connected positions is disclosed. The racking mechanism is dedicated to and contained within a standard footprint switchgear/board cabinet, thereby requiring no operator presence at or near the cabinet to move the position of the breaker (and no re-engineering of cabinet size). A wireless transceiver circuit for wirelessly controlling the position of the circuit breaker is also disclosed. A front panel of the cradle includes indicator lights for indicating the position of the circuit breaker and circuitry for controlling the same is also disclosed. Non-limiting examples of each of these implementations will be summarized below. These implementations, alone or in combination, advantageously allow an operator to rack a circuit breaker into and out of a switchgear/board at a safe distance away from the blast zone of an arc flash explosion. The indicator lights allow the operator to visually ascertain a racking position of the circuit breaker in the switchgear/board without having to be in close proximity to the circuit breaker or enclosure. These and other advantages will become apparent in the description that follows.

The motorized racking mechanism includes a motor fixed inside the cradle, which is coupled to a rotating member, such as a control screw, by a gear or belt system to turn the control screw. Rotation of the control screw causes a crown-wheel device to move laterally within the cradle toward the front or rear of the cradle, depending on the direction of rotation of the control screw. The crown-wheel device operates on a series of conventional mechanical components that draw the circuit breaker into or out of the cradle among the remove, test, and connected positions as the crown-wheel device moves laterally within the cradle under control of the motor. Movement of the crown-wheel device conventionally causes a manual position indicator to turn, and the angular position of the end of the manual position indicator is visible through the front panel to indicate the position (connected, test, or remove) of the circuit breaker. A state of a motor actuator switch controls whether the motor is turned on or off, and is positioned so that when a button arm protruding through the front panel is moved toward the interior of the cradle, a crank detent actuator to which the button arm is coupled closes the motor actuator switch, supplying current to the motor.

Optional position switches are strategically positioned relative to a cover over the crown-wheel device so that when the crown-wheel device arrives at positions corresponding to the remove, test, or connected positions of the circuit breaker, a corresponding position switch is closed, which causes the motor to be turned off. These position switches prevent the motor from being over-torqued. The power source for the motor operator is connected to an external AC or DC power source external to the switchgear/board which will power the motor and other electronic components of the racking mechanism. This connection to the motor circuit and wireless remote circuit can be accomplished through a connection terminal block at the top of the circuit breaker.

The motorized racking mechanism can be remotely controlled by operation of a wireless remote control device that transmits an instruction to a receiver module in the cradle causing the circuit breaker to be racked into or out of the switchgear/board. The receiver module is coupled to a solenoid whose plunger operates on a notch detent formed in the crank detent actuator. An operator, who can be in a different room from the one in which the switchgear/board is installed, presses a button on a remote control device, which sends a wireless (e.g., infrared or electromagnetic) signal to a receiver module in the cradle, which decodes the instruction and instructs the solenoid to actuate the plunger. The plunger moves the crank detent actuator out of a locked position, freeing the manual position indicator and allowing it to rotate. The crank detent actuator also closes the motor actuator switch, allowing current to flow to the motor. The movement of the crank detent actuator under solenoid control simulates a human depressing the button arm that protrudes through the front panel of the cradle. The operator can depress the button on the remote control each time the circuit breaker needs to be moved from one position to another.

Indicator lights are also visible on the front panel to indicate the position of the circuit breaker. The manual position indicator can be difficult to read from a distance, so the indicator lights permit the position of the circuit breaker to be ascertained from a distance as far away as the human eye can discern among the different colors (e.g., red, yellow, green). The closure of each position switch by the crown-wheel device causes a corresponding indicator light to be illuminated.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 2A is a side view of a functional block diagram of a circuit breaker in a connected position within the cradle of FIG. 1 with primary and secondary connectors of the circuit breaker connected to corresponding primary and secondary connectors of the cradle;

FIG. 2B is a side view of a functional block diagram of a circuit breaker in a test position within the cradle of FIG. 1 with secondary connectors of the circuit breaker connected to corresponding secondary connectors of the cradle;

FIG. 2C a side view of a functional block diagram of a circuit breaker in a remove position within the cradle of FIG. 1 with primary and secondary connectors of the circuit breaker disconnected from corresponding primary and secondary connectors of the cradle;

FIG. 2D is a side view of a functional block diagram of a circuit breaker in a withdrawn position relative to the cradle of FIG. 1;

Figure 1:
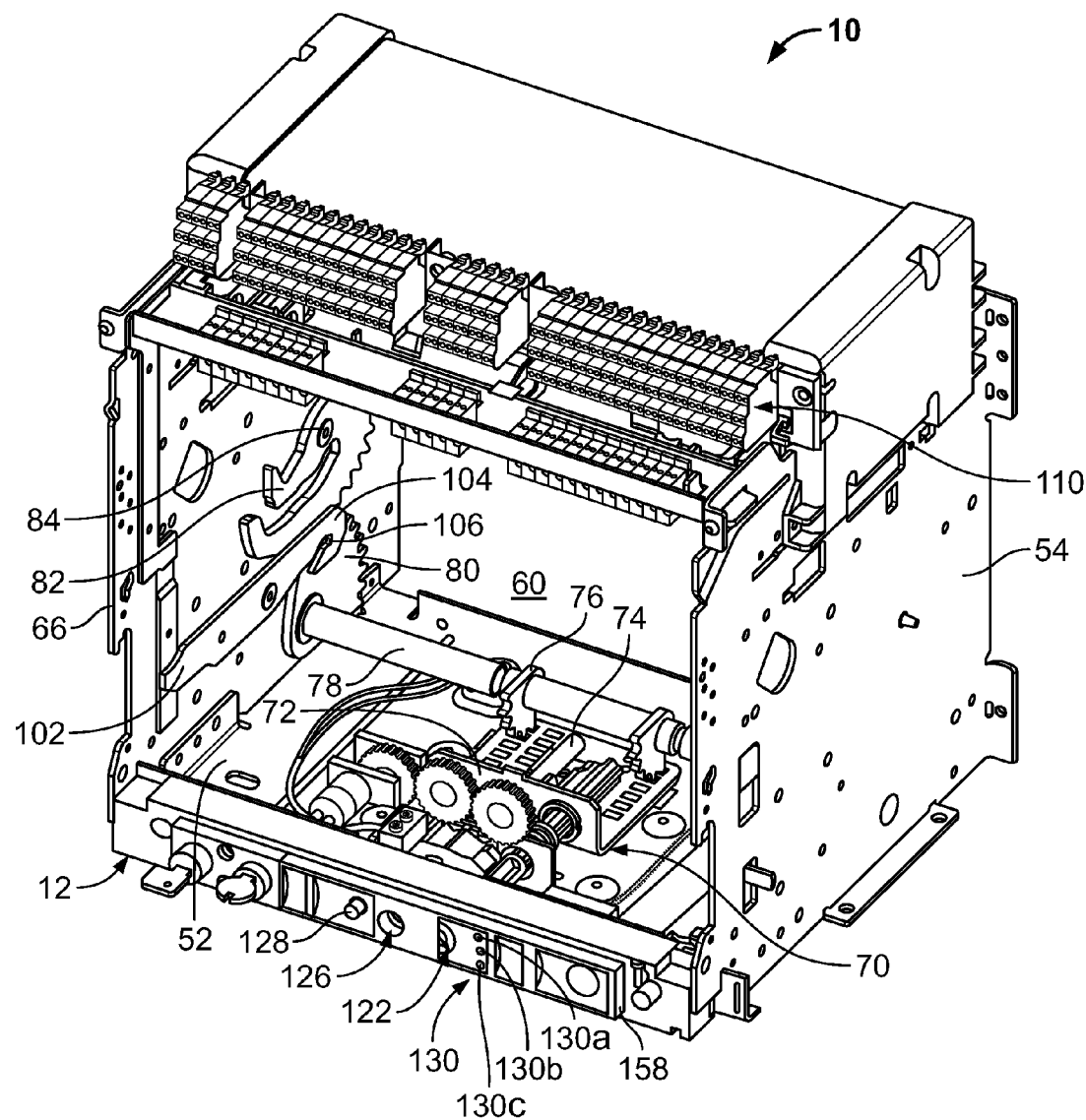
FIG. 1 is a perspective view of a cradle for use in electrical switchgear equipment according to an aspect of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a perspective view of a cradle 10 for use in electrical switchgear equipment (or switchgear/board). The switchgear/board can have a high, medium, or low voltage rating as defined by the American National Standards Institute (ANSI) or can refer to a "switchboard" as defined in Underwriters Laboratory Standard UL891. The terms switchgear and switchboard are referred to interchangeably herein and refer to the same device. The cradle 10 accepts a circuit breaker 14 (shown in FIGS. 2A-2D) inside a frame 12 in the form of an open housing. The open housing includes a base plate 52 and two opposite side walls 54, 56 confining a front opening for insertion or removal of the plug-in circuit breaker 14. The side walls 54, 56 are provided with a pair of parallel draw-in slides 114 (shown in FIG. 4) operable to support and guide the circuit breaker 14 as it is being racked into and out of the cradle 10. The draw-in slides 114 can be seen in FIG. 4 but have been removed in FIG. 1, so as to reveal other components of the cradle 10. Opposite the front opening is an insulating connecting base 60, through which fixed primary connectors 62, 64 (shown in FIGS. 2A-2D) pass. The fixed primary connectors 62, 64 of the cradle 10 are operable to be conventionally connected to a busbar (not shown) of the switchgear. In the connected position (FIG. 2A) of the circuit breaker 14, the primary terminals or connectors 34, 36 of the circuit breaker 14 are engaged in the fixed primary connectors 62, 64. The frame 12 supports a plug-in racking mechanism 70 that includes a crown-wheel device 72 operating in conjunction with a rotating member or a control screw 74 that is actuated by a racking handle or crank (not shown) inserted into a crank access hole 126 (FIG. 1) in the front panel 158 in the bottom area of the front of the cradle 10 below the circuit breaker 14 for manually racking the circuit breaker 14 into and out of the switchgear. The crown-wheel device 72 drives pinions 76 secured to a transverse draw-in shaft 78. The shaft 78 also supports at each of its ends a counter-pinion 80 that engages a toothed sector of a draw-in cam 82. Each draw-in cam 82 is mounted pivoting around a spindle 84 securely affixed to the frame 12. A lever 102 includes a hook 104 operating in conjunction with a spigot 106 fixed onto the corresponding counter-pinion 80.

Figure 4:
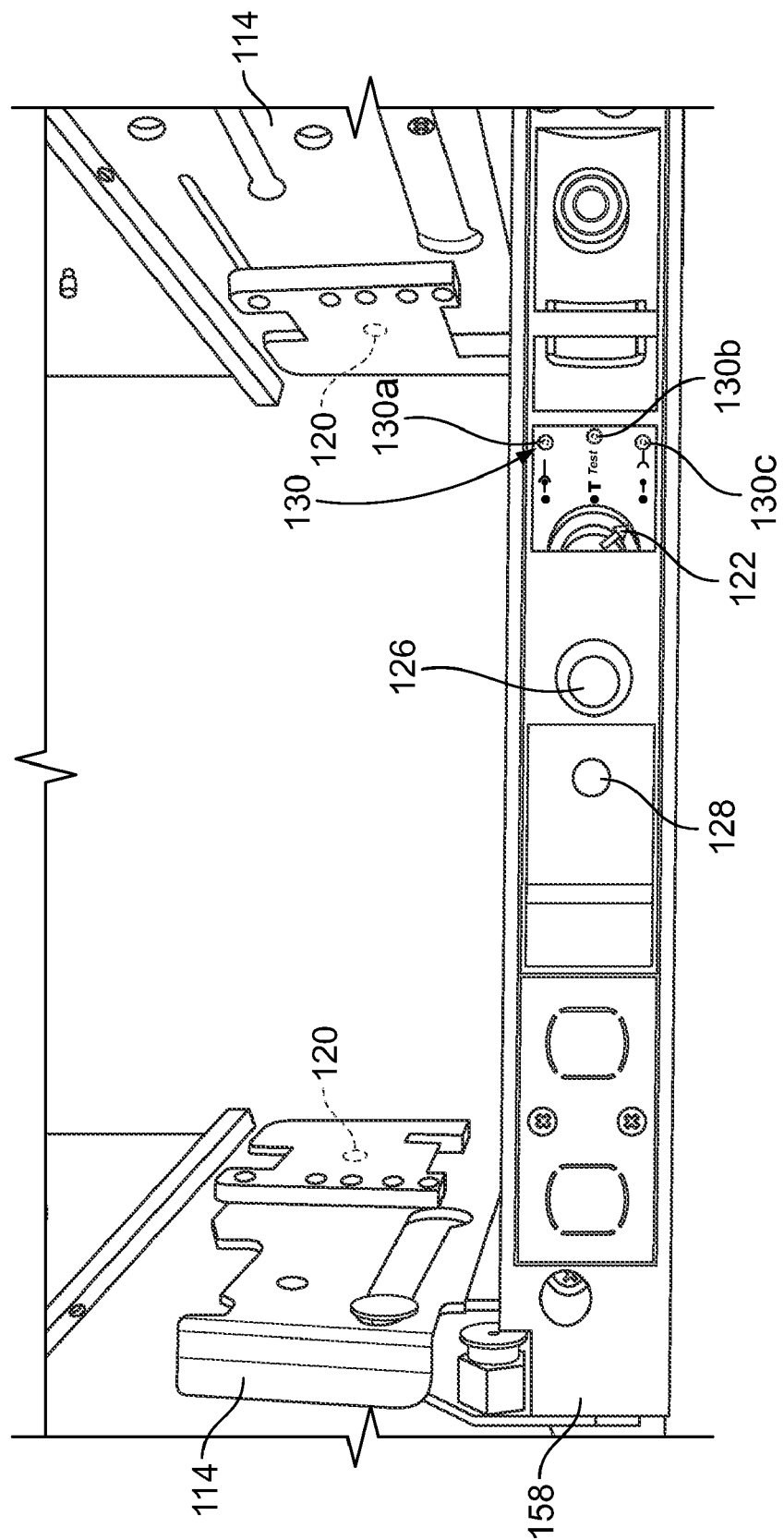
FIG. 4 is a front perspective view of the front panel of the cradle and the parallel draw-in slides to which the circuit breaker is attached.

The circuit breaker 14 is coupled to the draw-in slides 114, and a crankpin 120 (shown in dashed lines on a hidden surface opposite the exposed surface in FIG. 4) is received in the draw-in cam 82 shown in FIG. 1. As the draw-in cam 82 rotates clockwise about the spindle 84, the crankpin 120 is drawn toward the rear of the cradle 10, drawing with it the circuit breaker 14. Rotating the draw-in cams 82 counter-clockwise causes the crankpin 120 to be urged toward the front of the cradle 10, sliding the circuit breaker 14 out of the front opening of the cradle 10. Further details of conventional mechanical components involved in racking a circuit breaker into or out of a switchgear are disclosed in U.S. Pat. No. 6,160,229.

FIGS. 2A-2D illustrate four different positions of the circuit breaker 14 relative to the cradle 10. In FIG. 2A, the circuit breaker 14 is shown in a connected position within the cradle 10 of the switchgear. The primary connectors 34, 36 of the circuit breaker 14 are electrically connected to the corresponding primary connectors 62, 64 of the cradle 10. A secondary connector 88 of the circuit breaker 14 is electrically connected to a movable terminal block 92 of the cradle 10. The movable cradle block 92 is connected by wires to a fixed connection terminal block 110 on the top of the cradle 10. The movable cradle block 92 moves with the circuit breaker 14 as it is being urged between connected and test positions. The manual position indicator 122 on the cradle 10 indicates that the circuit breaker 14 is in the connected position. The procedure for installing the circuit breaker 14 into the connected position is referred to as "racking-in" the circuit breaker 14, during which the breaker is in a trip-free state to prevent closing the circuit breaker 14 before it is fully connected to the loads.

In FIG. 2B, the circuit breaker 14 is in a test position within the cradle 10 of the switchgear. The primary connectors 34, 36 of the circuit breaker 14 are electrically disconnected from the corresponding primary connectors 62, 64 of the cradle 10, but the secondary connector 88 of the circuit breaker 14 remains electrically connected to the movable cradle block 92 of the cradle 10. An auxiliary circuit, electrically connected to the circuit breaker 14 via the fixed connection terminal block 110, can test the electronic features of the circuit breaker 14, such as ground-fault detection features. The manual position indicator 122 indicates that the circuit breaker 14 is in the test position.

In FIG. 2C, the circuit breaker 14 is in a remove or disconnected position relative to the cradle 10 of the switchgear. The primary connectors 34, 36 of the circuit breaker 14 are electrically disconnected from the corresponding primary connectors 62, 64 of the cradle 10, and the secondary connector 88 of the circuit breaker 14 is also electrically disconnected from the movable cradle block 92 of the cradle 10. No electrical current can flow through the circuit breaker 14 in the remove position. The manual position indicator 122 indicates that the circuit breaker 14 is in the remove or disconnected position. The procedure for disconnecting the circuit breaker 14 from the connected or test positions is called racking out. During a racking-out sequence, the circuit breaker 14 is in a trip-free state to prevent closing the circuit breaker 14.

In FIG. 2D, the circuit breaker 14 is in a withdrawn position and is outside of the cradle 10. No electrical connections are made to the circuit breaker 14.

Figure 3A:
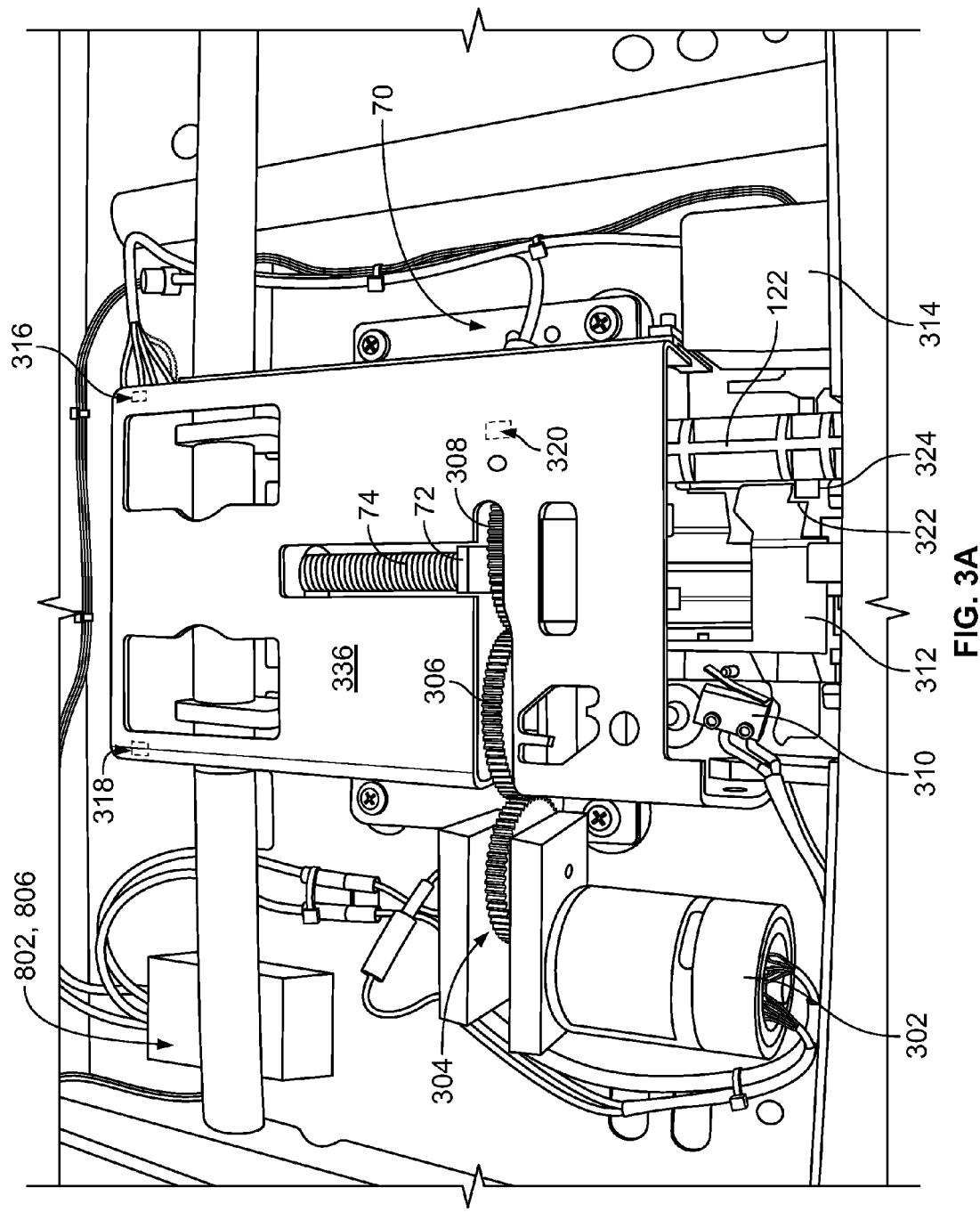
FIG. 3A is a top perspective view of a bottom portion of the cradle showing the motorized racking mechanism internal to the cradle shown in FIG. 1.

FIG. 3A is a top perspective view of a bottom portion of the cradle 10 showing the motorized racking mechanism 70 internal to the cradle 10. The racking mechanism 70 includes a motor 302 mechanically coupled to a first drive gear 304, a second drive gear 306, and a third drive gear 308. The third drive gear 308 is fixed to the control screw 74. The motor 302 is fixed to the base plate 52 of the cradle 10 and mounted such that its axis of rotation is parallel to the base plate 52 as shown. The drive gears 304, 306, 308 are mounted such that their respective axes of rotation are parallel to the base plate 52, allowing the motor 302 to impart rotational motion to the control screw 74 while being mounted transversely relative to the control screw 74. The entire racking mechanism 70 is designed to be no higher than the height of the front panel 158 of the cradle 10, approximately one to two inches in a standard cabinet. The bottom surface of the circuit breaker 14 does not interfere with the operation of the racking mechanism 70 when the circuit breaker 14 is racked into the cradle 10. Advantageously, the racking mechanism 70 with its associated components can be retrofitted into an existing installed switchgear/board that uses the cradle shown in FIG. 1 with relative ease.

Although drive gears 304, 306, 308 are shown as comprising the motor drive system, in other implementations, a planetary gear system or a belt system can be used for turning the control screw 74 instead of drive gears. The drive gears, planetary gear system, and belt system are different types of suitable drive members, as used herein, for turning the control screw 74 under control of the motor 302.

The on/off status of the motor 302 is controlled by a motor actuator switch 310 that is positioned to be actuated by a crank detent actuator 312. The crank detent actuator 312 is movable by a button arm solenoid 314, which is remotely and wirelessly controlled as described in more detail below. A button arm 128 (FIG. 4), which is part of the crank detent actuator 312 and protrudes through the front panel 158, is depressed to gain access to the hand crank access hole 126. A movable cover (not shown) is positioned over the hand crank access hole 126 to prevent a hand crank from being inserted into the hand crank access hole 126 until the button arm 128 is depressed, which causes the movable plate to be retracted, exposing the hand crank access hole 126 so that a hand crank can be inserted therein. The crank detent actuator 312 includes a detent engagement member 322 that engages a detent 324 of the manual position indicator 122, preventing the manual position indicator 122 from rotating. When the crank detent actuator 312 is moved toward the rear of the cradle 10, the detent engagement member 322 disengages from the detent 324, allowing the manual position indicator 122 to rotate, for example, in a counter-clockwise direction (i.e., the detent 322 begins to rotate toward the bottom surface of the cradle 10) to indicate the next position of the circuit breaker 14 in the cradle 10. The crank detent actuator 312 includes a first detent notch 326, a second detent notch 328, and a third detent notch 330 (shown in FIG. 9), one detent notch corresponding to each position (connected, test, and remove) positioned to engage the detent 324 at intervals corresponding to the positions to be indicated on the front panel 158 (FIGS. 2a-2c illustrate examples of the positions of an arrow on the manual position indicator 122 corresponding to exemplary interval angles between the positions).

Figure 3B:
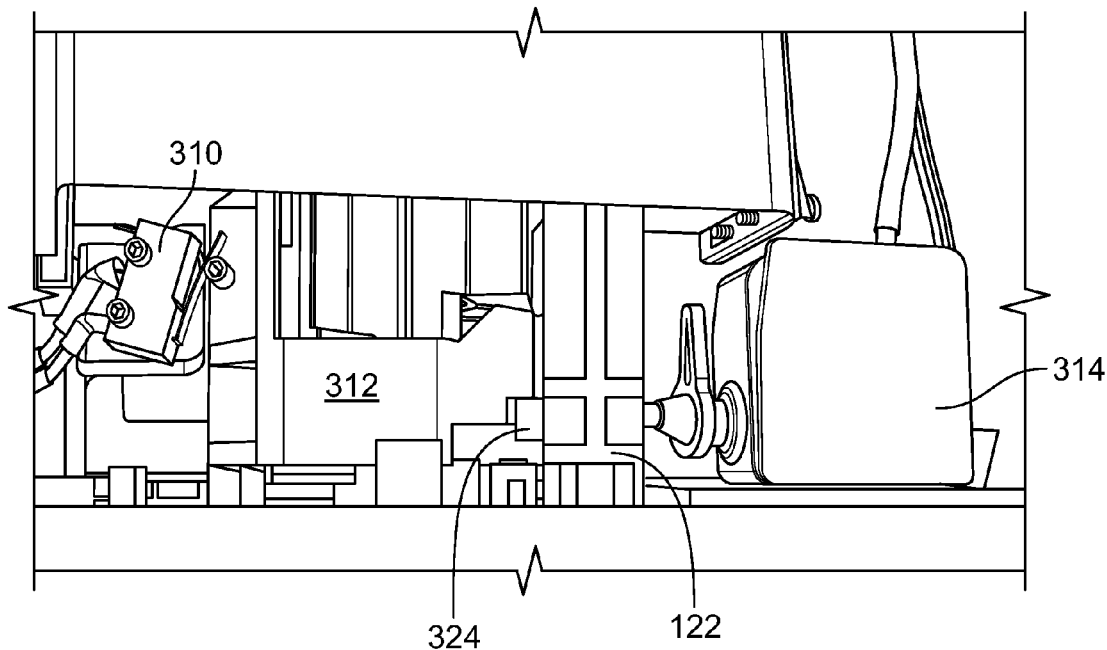
FIG. 3B is a top perspective view of the motorized racking mechanism of the cradle shown in FIG. 3A showing the manual position indicator engaged with the crank detent actuator.
Figure 3C:
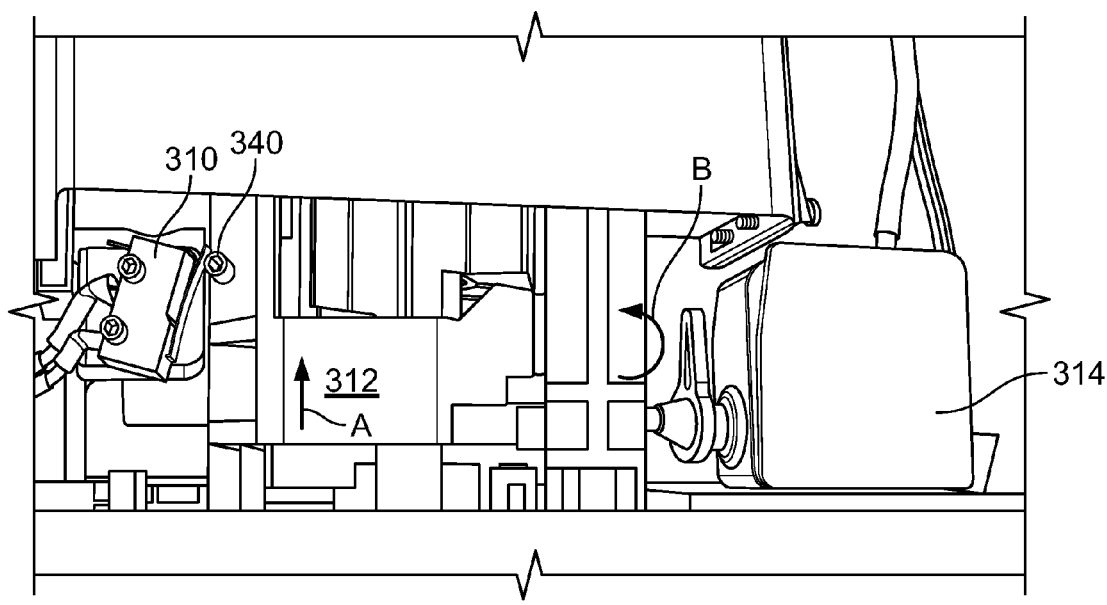
FIG. 3C is a top perspective view of the motorized racking mechanism of the cradle shown in FIG. 3A showing the manual position indicator disengaged from the crank detent actuator to allow the manual position indicator to rotate freely in a clockwise or counter-clockwise direction.

FIGS. 3B-3E illustrate various positions of the crank detent actuator 312 relative to the manual position indicator 122 to show the cooperation of these components as the circuit breaker 14 is racked into and out of the cradle 10. In FIG. 3A, the crank detent actuator 312 is shown in a third position corresponding to the remove position of the circuit breaker 14, just like shown in FIG. 3A. In FIG. 3B, the button arm 128 coupled to the crank detent actuator 312 has been depressed, either manually or under wireless remote control as described below, pushing the crank detent actuator 312 toward the rear of the cradle 10 as indicated by the arrow A and disengaging the detent engagement member 322 from the detent 324 of the manual position indicator 122 and out of a first detent notch 326 (see FIG. 3F). This disengagement allows the manual position indicator 122 to rotate counter-clockwise as indicated by the arrow B in FIG. 3B. The motor actuator switch 310 transitions from an open to a closed position as a peg 340 coupled to the crank detent actuator 312 moves past the motor actuator switch 310. The peg 340 and the motor actuator switch 310 are positioned relative to one another such that the motor actuator switch 310 is open when the button arm 128 of the crank detent actuator 312 is not depressed, and the motor actuator switch 310 is closed when the button arm of the crank detent actuator 312 is depressed, as shown in FIGS. 3*a* and 3*b*. Depressing the button arm 128 of the crank detent actuator 312 opens access to the hand crank access hole 126 via the front panel 158 of the cradle 10, permitting a crank (not shown) to be inserted therein.

Figure 3D:
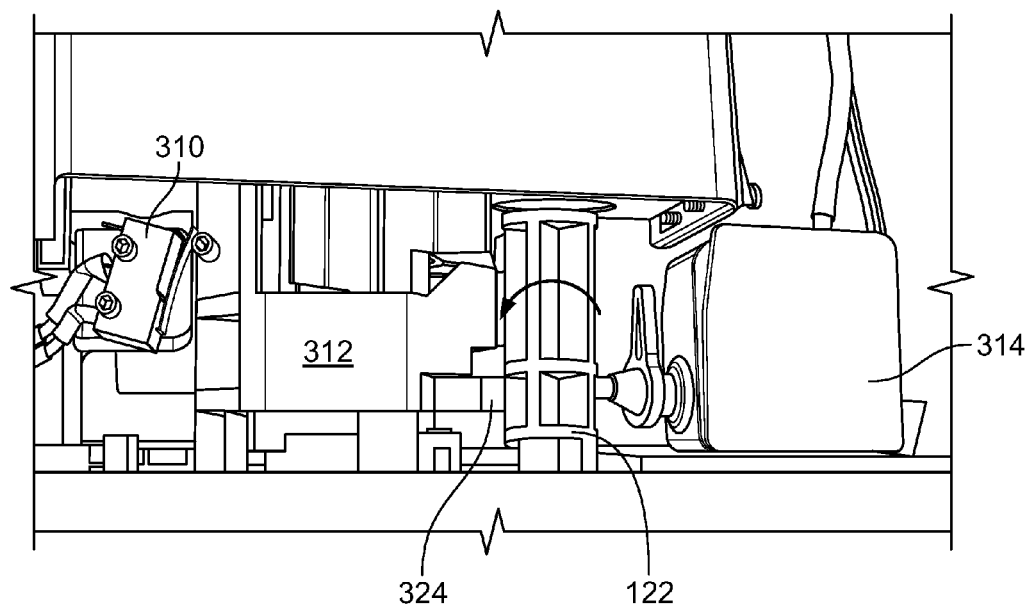
FIG. 3D is a top perspective view of the motorized racking mechanism of the cradle shown in FIG. 3A showing a detent of the manual position indicator rotating away from a corresponding notch detent as the manual position indicator rotates in a counter-clockwise direction relative to the front panel.
Figure 3E:
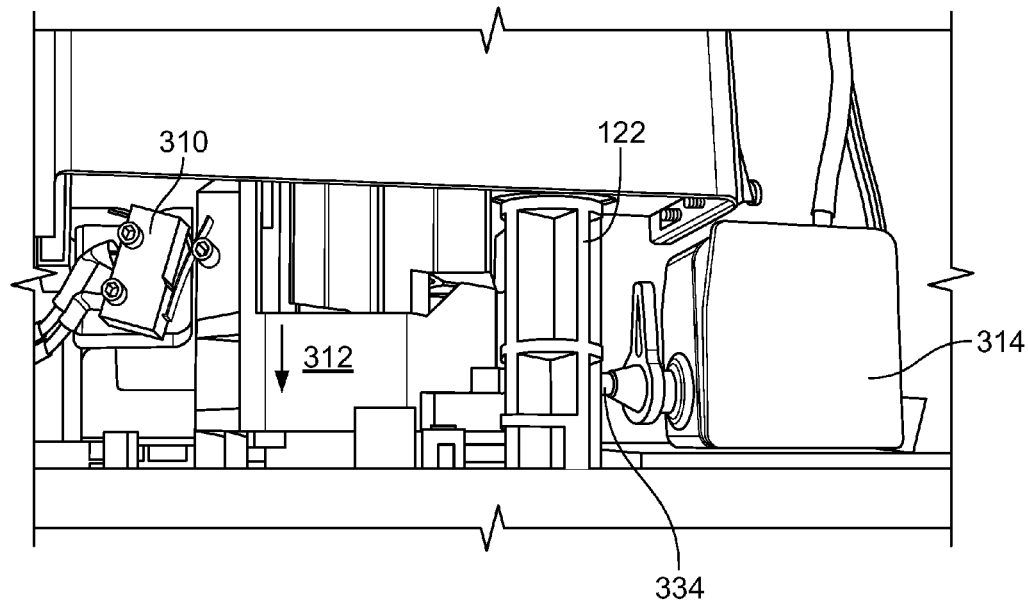
FIG. 3E is a top perspective view of the motorized racking mechanism of the cradle shown in FIG. 3A showing the crank detent actuator popped back to its original position as the detent of the manual position indicator engages a second detent notch of the crank detent actuator, preventing further movement of the manual position indicator.

When the motor actuator switch 310 is closed, the motor 302 causes the crown wheel device to move from the third position corresponding to the remove position of the circuit breaker 14 to a second position corresponding to the test position of the circuit breaker 14, in which the secondary connector 88 of the circuit breaker 14 electrically and mechanically connects to the connection terminal block 110. The detent 324 of the manual position indicator 122 begins to rotate counter-clockwise, as shown in FIG. 3D. The crank detent actuator 312 is spring-loaded by a spring (not shown) to urge the crank detent actuator 312 back to an original position toward the front of the cradle 10. In this original position (such as shown in FIG. 3A), the button arm 128 protrudes through the front panel 158 to permit depression thereof. The detent 324 continues to rotate counter-clockwise until it encounters the second detent notch 328 (shown in FIG. 3F), allowing the crank detent actuator 312 to return to the original position toward the front of the cradle 10, locking the manual position indicator 122 and preventing it from further rotation (shown in FIG. 3E). The motor actuator switch 310 is also opened, cutting off electrical current to the motor and shutting it off. Access to the hand crank access hole 126 is also closed. In FIG. 3E, the manual position indicator 122 has transitioned from the third position corresponding to the remove position of the circuit breaker 14 to the second position corresponding to the test position of the circuit breaker 14, and the crank detent actuator 312 has returned to the original position toward the front of the cradle 10 as indicated by the arrow.

To transition the crank detent actuator 312 from the second position to a first position corresponding to the connected position of the circuit breaker 14, the process above is repeated, where the button arm 128 is depressed manually or caused to be depressed under wireless remote control as described below, causing the crank detent actuator 312 to move toward the rear of the cradle 10, which disengages the detent 324 of the manual position indicator 122 allowing the indicator 122 to rotate counter-clockwise until the detent 324 encounters the third detent notch 330 (shown in FIG. 3F). The spring-loaded tension of the crank detent actuator 312 will urge the detent 324 into the third detent notch 330 as the manual position indicator 122 rotates into that position, popping the crank detent actuator 312 back to the original position as indicated by the arrow in FIG. 3E.

To transition the crank detent actuator 312 from the first position, back to the second position, and finally to the third position, the process above is repeated, except that the manual position indicator is rotated clockwise, instead of counter-clockwise, and the crown-wheel device 72 is urged from the rear of the cradle 10 toward the front of the cradle 10, causing the circuit breaker 10 to be moved from the connected position, to the test position, and to the remove position where it can be removed from the cradle 10 and out of the switchgear.

Figure 3F:
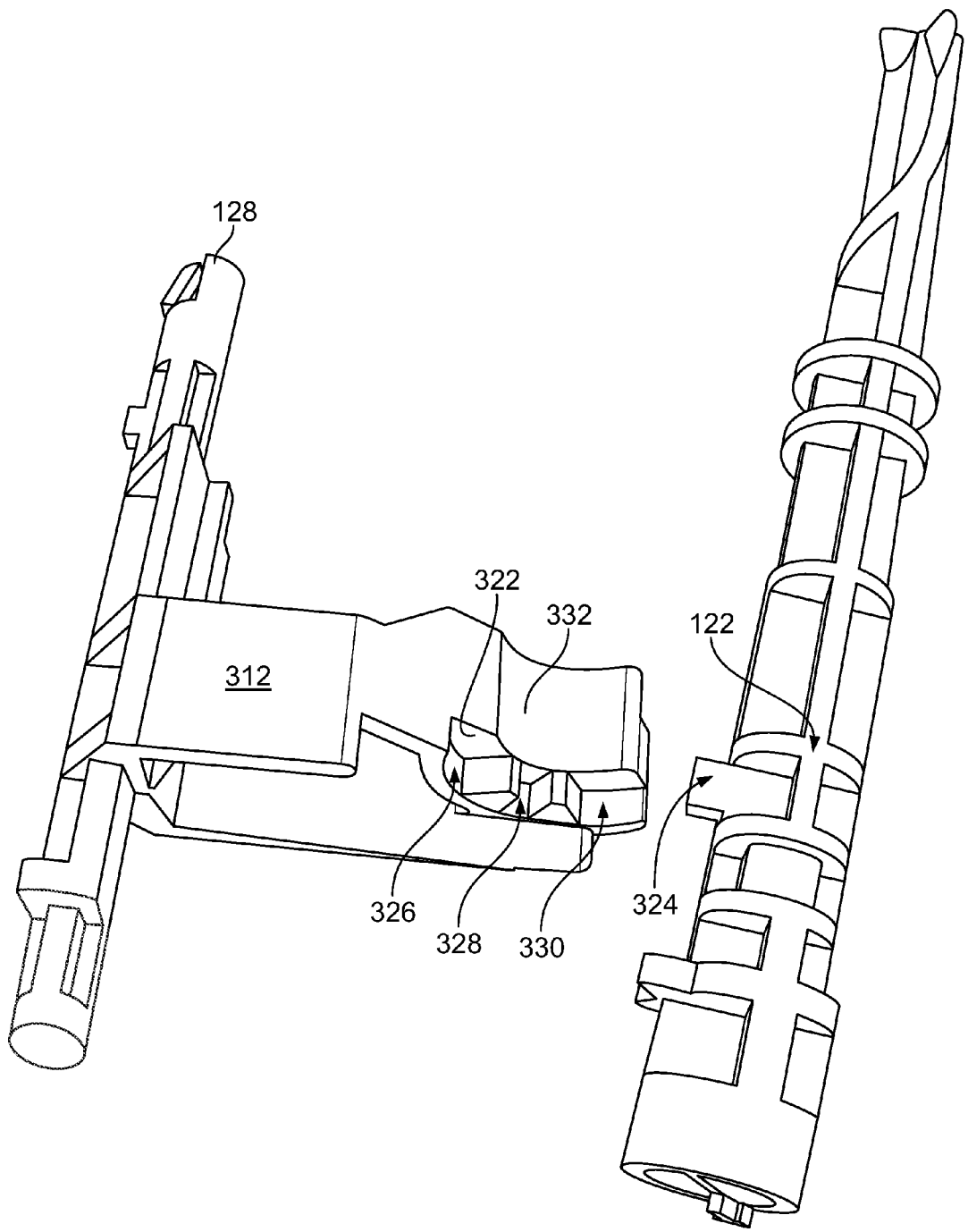
FIG. 3F are perspective views of the crank detent actuator and the manual position indicator removed from the racking mechanism to reveal the notch detents of the crank detent actuator.

FIG. 3F illustrates the crank detent actuator 312 and the manual position indicator 122 removed from the racking mechanism 70. The button arm 128 of the crank detent actuator is shown at the top of FIG. 3F, and the detent notches 326, 328, 330 can be clearly seen. The crank detent actuator 312 also includes a recessed depression 332 that goes underneath the manual position indicator 122 (as seen in FIG. 3H) when assembled into the racking mechanism 70. The detent 324 pops in and out of the various detent notches 326, 328, 330 as the manual position indicator 122 is rotated clockwise (e.g., to rack the circuit breaker 14 from the connected to the test positions) or counter-clockwise (e.g., the rack the circuit breaker 14 from the test to the connected positions) and the spring-loaded crank detent actuator 312 is pushed out of its original position toward the rear of the cradle 10 and snaps back to the original position toward the front of the cradle 10.

Figure 3G:
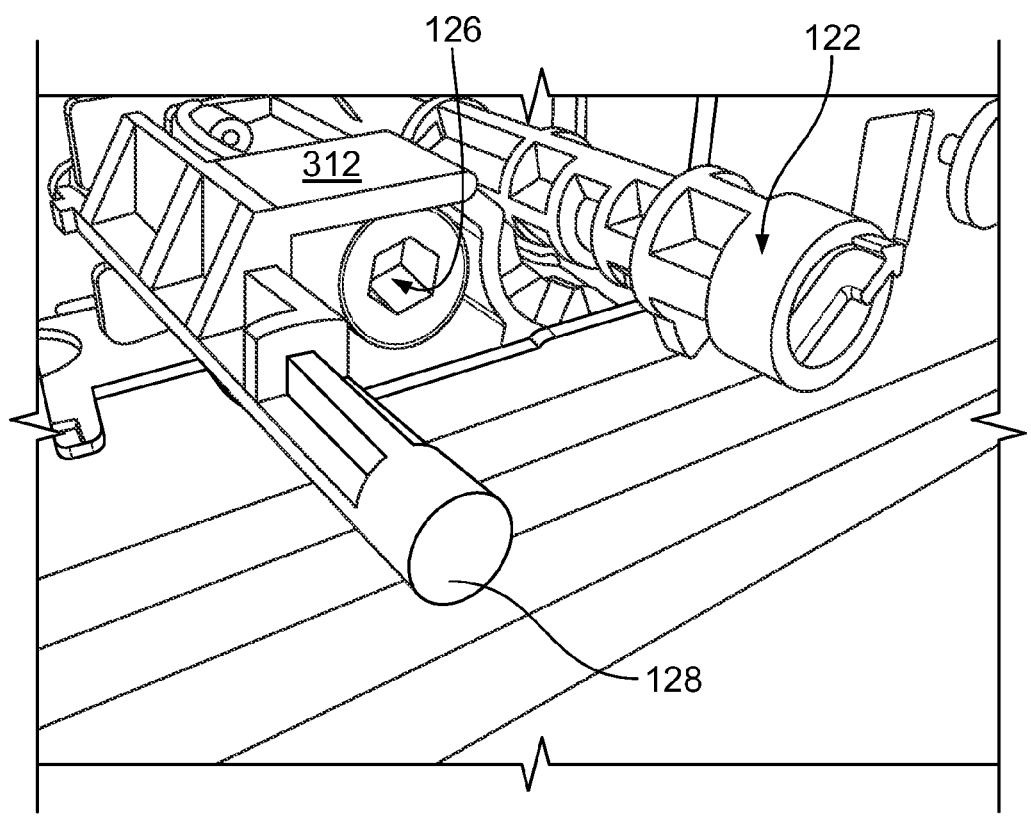
FIG. 3G is a front perspective view of the racking mechanism showing the button arm of the crank detent actuator and the manual position indicator with the front panel removed.
Figure 3H:
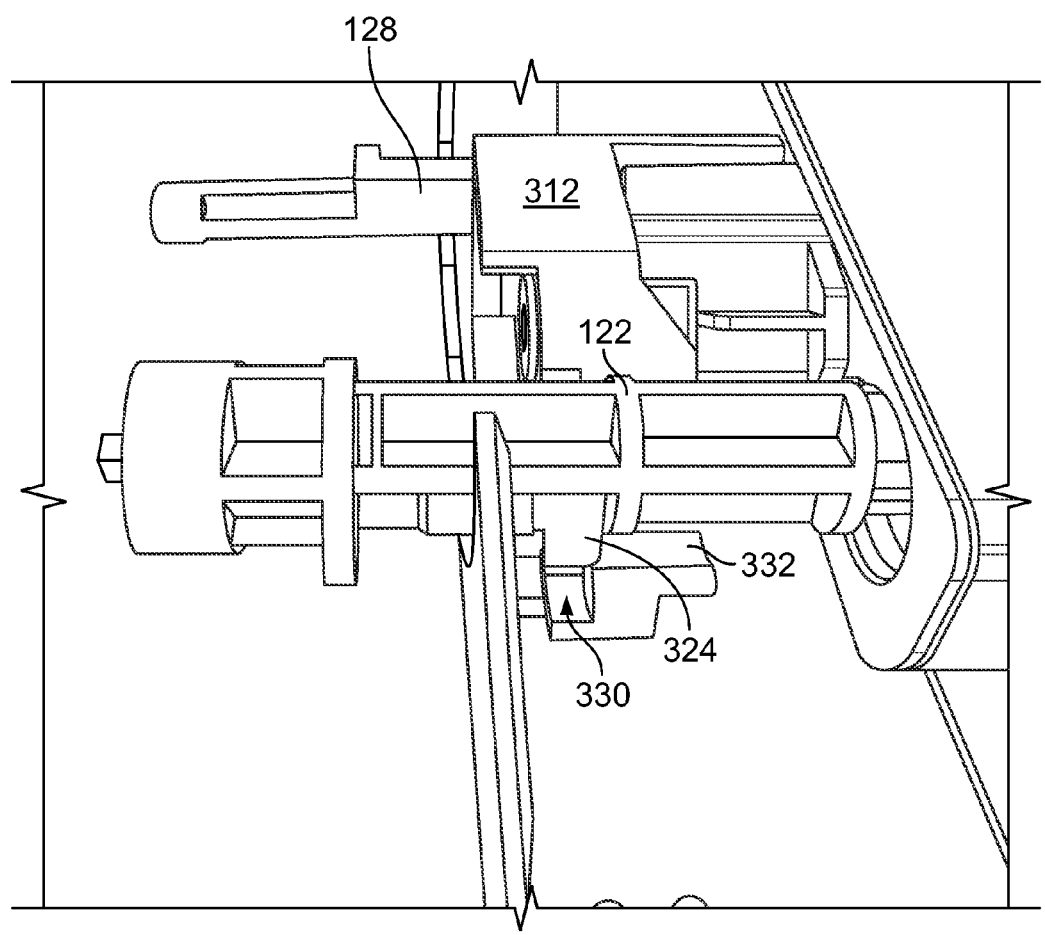
FIG. 3H is a side perspective view of the racking mechanism shown in FIG. 3G to show the notch detent that receives a plunger of the button arm solenoid.

FIGS. 3*g* and 3*h* illustrate close-up views of the crank detent actuator 312 and the manual position indicator 122 with the front panel 158 removed. In FIG. 3G, the hand crank access hole 126 is visible, and in FIG. 3H, the recessed depression 332 is shown underneath the manual position indicator 122. The detent 324 is shown in FIG. 3H in the third detent notch 330. A plunger 334 (FIG. 3E) of the button arm solenoid 314 acts against the third detent notch 330 to move the crank detent actuator 312 from the original position to second position in which the motor 302 can be activated. A portion of the plunger 334 extends underneath a portion of the manual position indicator 122 as shown in FIGS. 3*d* and 3*e*. As shown in FIGS. 3*g* and 3*h*, the manual position indicator 122 can freely rotate clockwise or counter-clockwise as long as the crank detent actuator 312 is pushed toward the rear of the cradle 10 at a distance such that the detent 324 disengages from one of the detent notches 326, 328, 330.

Three optional position switches 316, 318, 320 or sensors (shown in FIG. 3A) are positioned relative to a cover 336 in the path of the crown wheel device 72 to detect the various positions of the circuit breaker 14 as it is racked into and out of the cradle 10. A connected position switch 316 is positioned at a rear-most (relative to the front of the cradle 10) point of the crown wheel device 72 (referred to as a first position corresponding to the connected position of the circuit breaker 14) as it moves toward the rear of the cradle 10 and away from the front opening. A test position switch 318 is positioned to close when the crown wheel device 72 has been moved to the second position corresponding to the test position of the circuit breaker 14. Finally, a remove position switch 320 is positioned at the front-most point of the crown wheel device 72 when it is at the front-most position relative to the front opening of the cradle 10 (referred to as the third position of the crown-wheel device 72 corresponding to the remove position of the circuit breaker 14). In this front-most position, the crown wheel device 72 is in a position corresponding to the remove position of the circuit breaker 14. The state of these position switches 316, 318, 320 is used for illuminating one of the three indicator lights 130*a,b,c* on the front panel 158 and for stopping the motor 302 from over-torquing the drive gears 304, 306, 308, as described in more detail below. The position switches 316, 318, 320 can be microswitches, for example, though any other suitable switches are contemplated.

Figure 5:
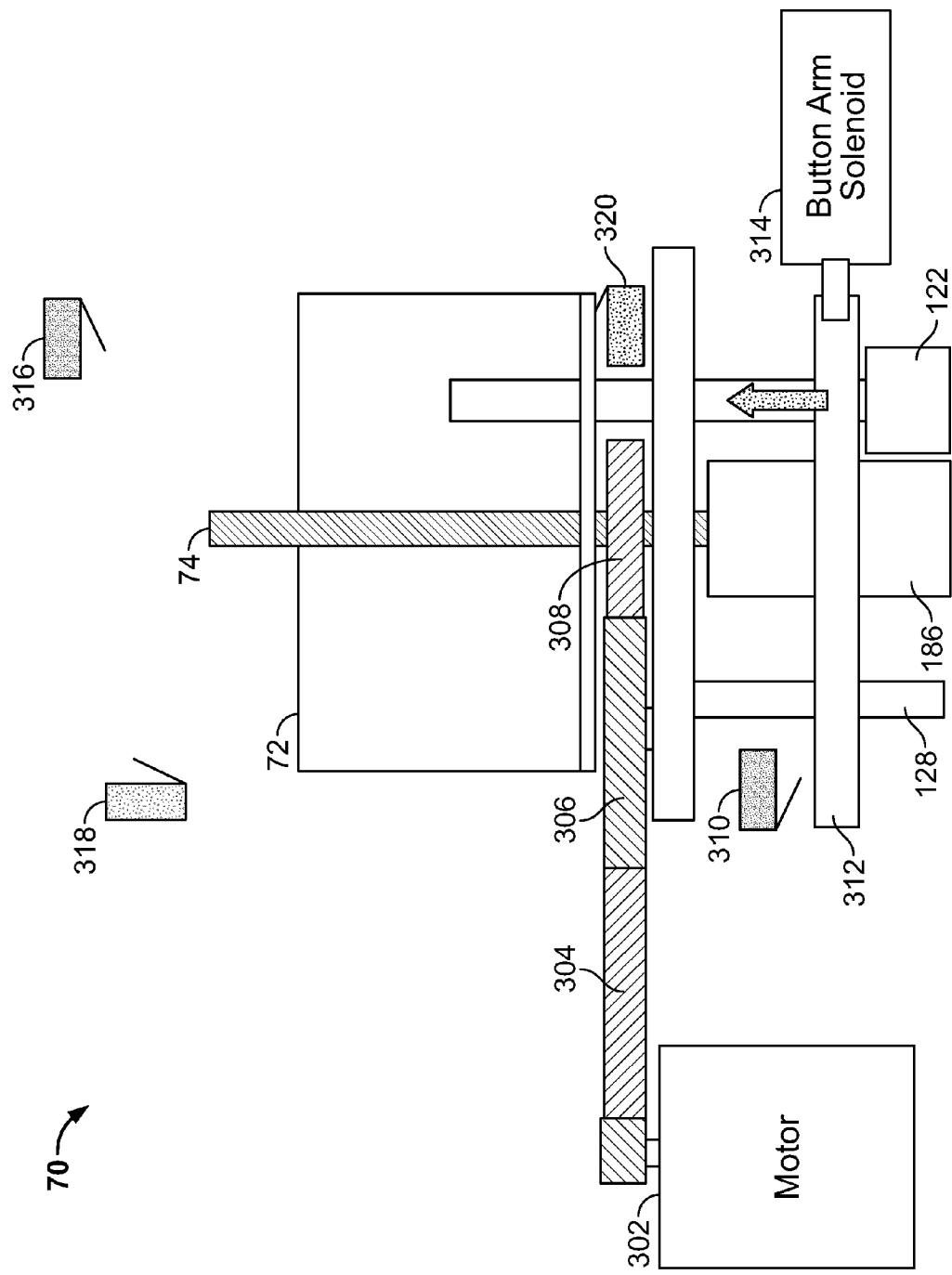
FIG. 5 is a functional block diagram of the racking mechanism in a third position corresponding to a remove position of the circuit breaker.
Figure 6:
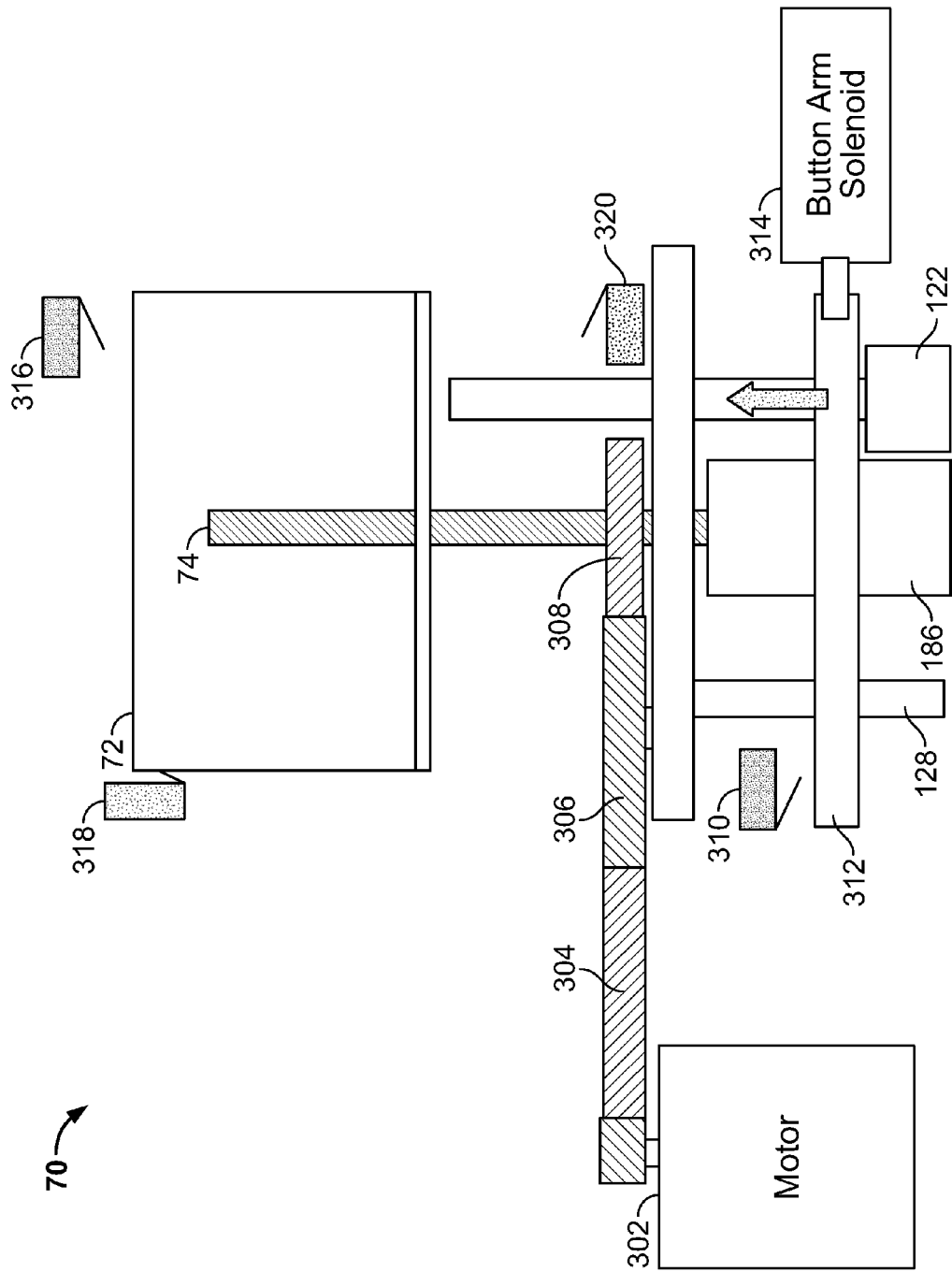
FIG. 6 is a functional block diagram of the racking mechanism in a second position corresponding to a test position of the circuit breaker.
Figure 7:
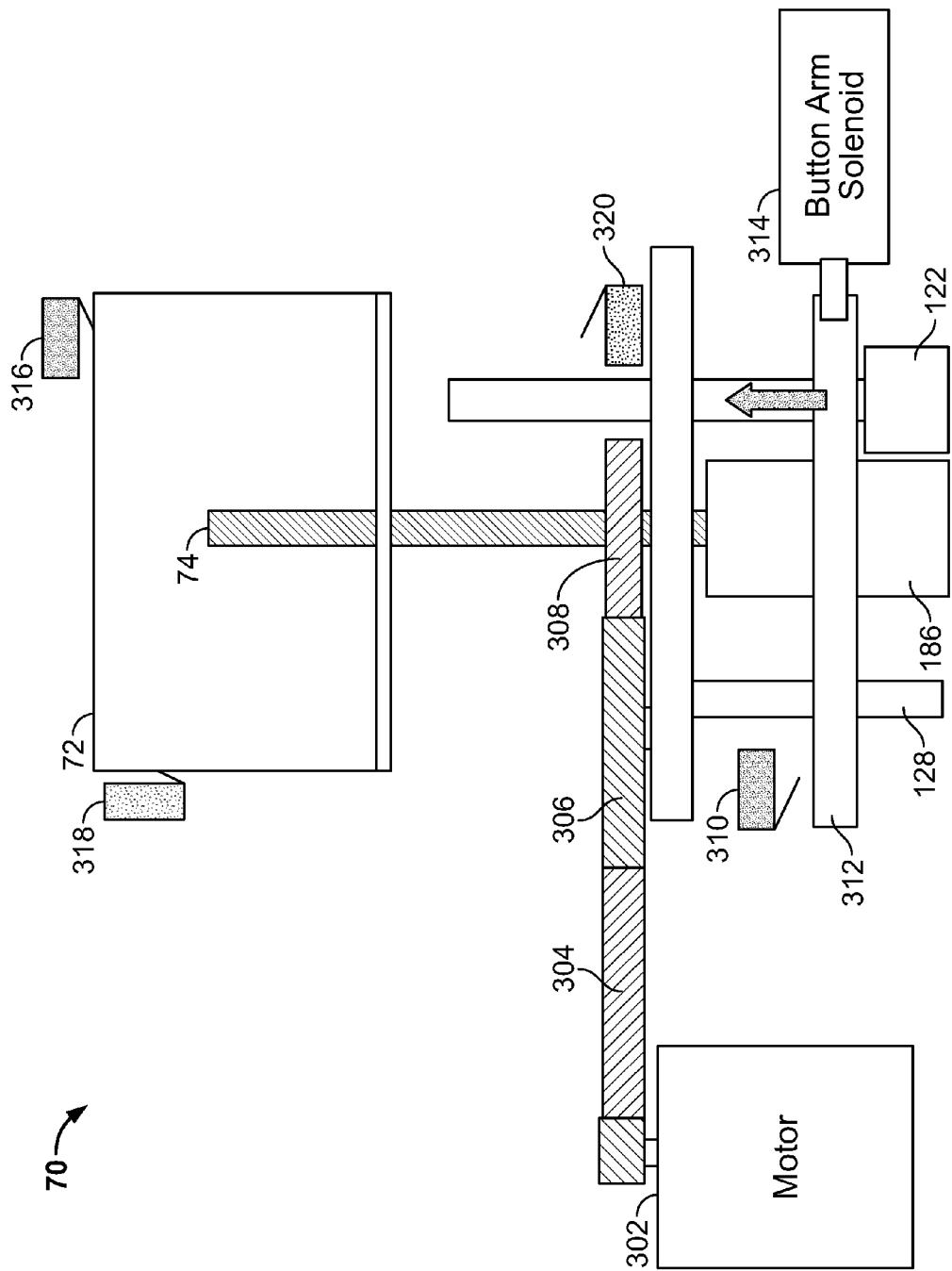
FIG. 7 is a functional block diagram of the racking mechanism in a first position corresponding to a connected position of the circuit breaker.
Figure 8:
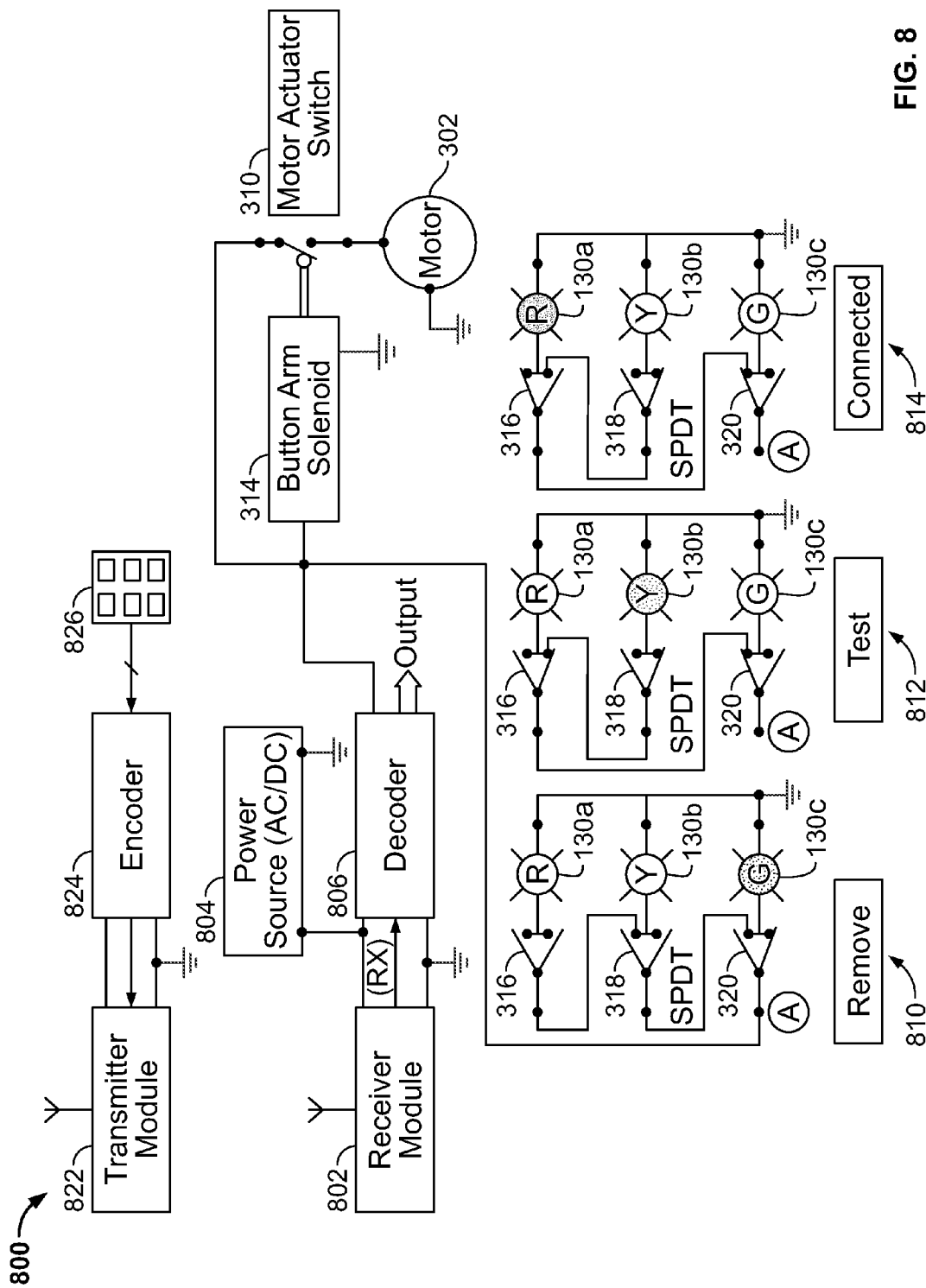
FIG. 8 is a functional block diagram of a wireless transceiver circuit coupled to a button arm solenoid of the racking mechanism and a light indicator circuit for selectively illuminating one of the light indicators depending upon the position of the circuit breaker in the cradle.

FIGS. 5-7 illustrate a sequence of racking in (or racking out) a circuit breaker among a remove position (FIG. 5), a test position (FIG. 6), and a connected position (FIG. 7) by reference to a top view of the racking mechanism 70 shown in FIG. 3A. FIG. 8 is functional block diagram of a wireless button arm control circuit 800 for wirelessly and remotely controlling the button arm solenoid 314. Operation of various racking procedures will be described in connection with FIGS. 5-8 next.

FIG. 5 illustrates a top view of the racking mechanism 70 (FIG. 3A) in the remove position. In this position, the crown-wheel device 72 is in a third position that corresponds to the remove position of the circuit breaker 14. The crown-wheel device 72 abuts against the remove position switch 320, putting it in a closed state. In response to the remove position switch 320 being closed, current is cut off to the motor 302, stopping it from rotating, and the indicator light 130c is illuminated (preferably using a green color to indicate that the operator has a "green light" to safely remove the circuit breaker 14). This circuit configuration 810 is shown in FIG. 8. To move the circuit breaker 14 from the remove position (FIG. 5) to the test position (FIG. 6), an operator, without touching or contacting any part of the switchgear/board, cradle, or circuit breaker, pushes a button 826 coupled to the transmitter module 822, which produces a wireless signal indicative of the button pushed, which is received by the receiver module 802 and decoded by a decoder 806 into an output that commands the button arm solenoid 314 to operate the plunger 334 (FIG. 3E), which pushes against the third detent notch 330, urging the crank detent actuator 312 away from its original position in a direction toward the motor actuator switch 310, eventually completing a circuit between the motor 302 and a power source 804, such as a battery, housed inside the cradle 10, which also powers the motor 302. The motor 302 is preferably a direct current (DC) motor, but can also be an AC motor. The external or internal power source 804 can power all of the electronic components of the racking mechanism 70 inside the cradle 10. In this manner, the power source internal or external to the cradle 10 needs to be connected to power the electronic components of the racking mechanism 70 (such as the motor 302, the solenoid 314, the indicator lights 130, the switches 310, 316, 318, 320, the receiver module 802, and the decoder 806).

When the motor actuator switch 310 is closed by the crank detent actuator 312, the motor 302 turns the drive gears 304, 306, 308, which in turn causes the control screw 74 to rotate, which causes the crown wheel device 72 to move laterally (horizontally relative to earth) toward the rear of the cradle 10. As the crown wheel device 72 moves laterally, it drives through a ratchet action the pinion 76, which is secured to the transverse draw-in shaft 78, which begins to rotate. The rotation of the draw-in shaft 78 causes the counterpinion 80 to rotate, causing the draw-in cam 82 to rotate via engagement of a toothed section thereof. As the draw-in cam 82 rotates about the spindle 84, the crankpin 120 is pulled toward the rear of the cradle 10. The crankpin 120 is attached to the rail handle 114, which is secured to the circuit breaker 14, causing the circuit breaker 14 to be racked into the cradle 10.

As the remove position switch 320 is opened, the indicator light 130c is turned off. The motor 302 continues to drive the control screw 74 via the drive gears 304, 306, 308 until the crown-wheel device 72 closes the test position switch 318 (FIG. 6). Upon closure of the test position switch 318, the indicator light 130b is illuminated, as shown in the circuit 812 in FIG. 8. As the crown-wheel device 72 moves laterally toward the rear of the cradle 10, the crank detent actuator 312 rotates to indicate the position of the circuit breaker 14 via the manual position indicator 122. When the crown-wheel device 72 reaches the test position (FIG. 6), the crank detent actuator 312 is returned to its original position toward the front of the cradle 10 as shown in FIG. 3A. If an operator is manually turning the control screw 74 via a crank inserted into a hand crank socket 186 through the hand crank access hole 126, the operator is prevented from continuing to crank the control screw 74 when the crank detent actuator 312 is in the original position. Preferably, the indicator light 130b is yellow, to indicate that the circuit breaker 14 is in a test position. The yellow color indicates that the circuit breaker 14 may still be energized, albeit via its secondary connector 88.

To move the circuit breaker 14 from the test position (FIG. 6) to the connected position (FIG. 7), the operator presses a button 826 to instruct the button arm solenoid 314 to close the motor actuator switch 310, causing the motor 302 to begin driving the drive gears 304, 306, 308, which causes the rotating member or control screw 74 to rotate, causing the crown wheel device 72 to move further toward the rear of the cradle 10. The indicator light 130b remains illuminated until the crown wheel device 72 closes the connected position switch 316, at which point several things happen. The crank detent actuator 312 rotates to indicate the position via the manual position indicator 122, and pops out of position to prevent further movement by manual cranking (as described above in connection with FIGS. 3a-3h). The motor actuator switch 310 opens, stopping the motor 302. The indicator light 130b is switched off, and the indicator light 130a is turned on, as shown in the circuit 814 in FIG. 8. Preferably, the indicator light 130a is red to indicate that the circuit breaker 14 is racked in and caution should be exercised around the circuit breaker 14.

Turning now to FIG. 8, the wireless button arm control circuit 800 includes an infrared (IR) or frequency receiver module 802 that receives a wireless IR signal or an electromagnetic signal (e.g., a radio signal) from the remote transmitter module 822. By "remote," the operator need not even be present in the same room that houses the switchgear containing the cradle 10. Rather, the operator need only a line of sight (for reception of IR signals) or be within a range for the electromagnetic signal to be received by the receiver module 802. The operator does not contact any part of the switchgear or anything connected to any part of the switchgear. No wires are needed between the switchgear and the operator. In this manner, the operator can be safely positioned a significant distance away from the switchgear, and even in another room altogether, drastically reducing or even eliminating any potential for injury to the operator in the event of an arc flash or other calamitous event. The operator can quickly learn by visual inspection of the indicator lights 130 the position of the circuit breaker 14. The indicator lights 130, which are preferably light emitting diodes, are much easier to discern from a significant distance, or at least from a distance greater than a position of the manual position indicator 122 is discernible. Otherwise, the operator would have to come closer to the cradle 10 to view the position of the manual position indicator 122, putting the operator closer to the potential hazard. From a safe distance, the operator can not only control the racking operations of the circuit breaker 14 into and out of the switchgear, but the operator can also visually verify any racking position from that safe distance.

The transmitter module 822 is electrically coupled to an encoder 824, which receives inputs from buttons 826 on a control device operated by a human operator. The decoder 806 and the encoder 824 can be, for example, a PIC microcontroller available from Microchip Technology based in Chandler, Ariz. The encoder 824 encodes each signal received from the corresponding buttons 826 into a distinct signal for transmission by the transmitter module 822. The transmitter module 822 and the encoder 824 are conventionally powered by a power source, such as a battery (not shown). The receiver module 802 receives the wireless signal transmitted by the transmitter module 822, which is decoded by the decoder 806 into an output signal that commands the appropriate button arm solenoid of the appropriate cradle in the switchgear to activate as described above.

The receiver module 802, power source 802, and decoder 806 are not shown in FIG. 1, but it should be understood that these components can be housed anywhere inside the cradle 10, preferably in the area on the bottom of the cradle 10 behind the front panel 158. Similarly, the primary connectors 62, 64 shown in FIGS. 2A-2D are not shown in FIG. 1 for ease of illustration.

Although one racking mechanism 70 is shown in one cradle 10, a typical switchgear/board has multiple cradles for receiving multiple circuit breakers. It is contemplated that each such cradle can be equipped with the racking mechanism 70 described herein. All of the electrical components of each respective racking mechanism 70 can be powered by a single power source within the switchgear/board or by individual respective power sources within the switchgear/board. Alternately, the electrical components can be powered by a power source external to the switchgear/board. The buttons 826 can be encoded to produce a different IR pattern or a different electromagnetic frequency so that the receiver module 802 can differentiate among different commands from the operator and control different racking mechanisms 70 in different cradles of the switchgear/board. No external devices need to contact any part of the cradle or circuit breaker to accomplish a racking in or racking out operation of a circuit breaker. However, the racking mechanism 70 of the present disclosure does not preclude manual racking operations, so that operation still remains an option for the operator, for example, in the event the power source 804 internal to the cradle 10 fails.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. An assembly for racking a circuit breaker into and out of electrical switchgear, comprising a cradle that houses a racking mechanism for racking a circuit breaker into and out of electrical switchgear, the racking mechanism including a motor fixed inside the cradle and coupled to a drive member that turns a control screw, which drives the racking mechanism causing the circuit breaker to be racked into or out of the switchgear among a plurality of positions,
   wherein the plurality of positions includes a connected position in which primary connectors of the circuit breaker are electrically connected to corresponding primary connectors inside the cradle, a remove position in which the primary connectors of the circuit breaker are electrically disconnected from the corresponding primary connectors of the cradle for safe removal of the circuit breaker from the switchgear, and a test position that is intermediate the connected and remove positions in which the primary connectors of the circuit breakers are electrically disconnected from the corresponding primary connectors of the cradle and in which a secondary connector of the circuit breaker is electrically connected to a corresponding terminal block in the cradle for electrical connection to an auxiliary circuit for testing electronic features of the circuit breaker, the assembly further comprising:
   a first switch positioned to be actuated in response to the circuit breaker being racked in the connected position;
   a second switch positioned to be actuated in response to the circuit breaker being racked in the test position; and
   a third switch positioned to be actuated in response to the circuit breaker being racked in the remove position, wherein actuation of any of the first, second, or third switches causes the motor to be turned off.

2. The assembly of claim 1, wherein the racking mechanism further includes a crown-wheel device coupled to the control screw, the crown-wheel device being positioned relative to the first, second, and third switches to such that:
   movement of the crown-wheel device to a first position corresponding to the connected position actuates the first switch,
   movement of the crown-wheel device to a second position corresponding to the test position actuates the second switch, and
   movement of the crown-wheel device to a third position corresponding to the remove position actuates the third switch.

3. The assembly of claim 1, further comprising a power source housed inside the switchgear for supplying electrical current to the motor, wherein the motor is a direct current (DC) motor.

4. The assembly of claim 1, wherein the motor is coupled to the drive member by at least one gear or a belt.

5. The assembly of claim 1, further comprising a wirelessly controlled solenoid for causing the circuit breaker to move among the plurality of positions within the switchgear.

6. The assembly of claim 1, wherein the solenoid is coupled to a crank detent actuator, wherein the solenoid causes the crank detent actuator to move and close a motor actuator switch, causing the motor to cause the drive member to turn.

7. The assembly of claim 6, wherein the crank detent actuator is coupled to a button arm that protrudes through a front panel of the cradle, the button arm and the crank detent actuator being arranged such that depression of the button arm causes the crank detent actuator to close the motor actuator switch.

8. The assembly of claim 6, wherein the solenoid includes a plunger that operates on a notch detent formed in the crank detent actuator such that operation of the plunger causes the crank detent actuator to move to close the motor actuator switch.

9. The assembly of claim 1, wherein the racking mechanism is positioned below the circuit breaker.

10. The assembly of claim 1, further comprising a wireless receiver module coupled to a solenoid, the wireless receiver module controlling actuation of the solenoid and being configured to, responsive to receiving an indication wirelessly from a remote transmitter module, cause the solenoid to actuate and thereby move a crank detent actuator coupled to the solenoid, the movement of the crank detent actuator closing a motor actuator switch, which causes the motor to cause the drive member to turn.

11. The assembly of claim 1, wherein the cradle includes a front panel, the assembly further comprising a plurality of indicator lights on the front panel for indicating in which of the plurality of positions the circuit breaker is.

12. The assembly of claim 1, wherein the drive member is a drive gear fixed to the control screw, wherein rotation of the control screw causes lateral movement of a crown wheel device between a front and a rear of the cradle, the circuit breaker being mounted through the front of the cradle and racked into the switchgear by causing the circuit breaker to move from the front to the rear of the cradle in the switchgear.

13. The assembly of claim 1, wherein the motor is powered by a battery that is housed inside the cradle.

14. An assembly for remotely racking a circuit breaker into and out of electrical switchgear, comprising:

a cradle that houses a racking mechanism for racking a circuit breaker into and out of electrical switchgear, the racking mechanism including a motor fixed inside the cradle and coupled to a drive member that turns a control screw, which drives the racking mechanism causing the circuit breaker to be racked into or out of the switchgear among a plurality of positions; and a wireless receiver module coupled to a solenoid, the wireless receiver module controlling actuation of the solenoid and being configured to, responsive to receiving an indication wirelessly from a remote transmitter module, cause the solenoid to actuate and thereby move a crank detent actuator coupled to the solenoid, the movement of the crank detent actuator closing a motor actuator switch, which causes the motor to cause the drive member to turn.

15. The assembly of claim 14, wherein the cradle further includes a front panel, the assembly further comprising a plurality of indicator lights on the front panel for indicating in which of the plurality of positions the circuit breaker is.

16. The assembly of claim 14, wherein the solenoid includes a plunger that operates on a notch detent formed in the crank detent actuator such that operation of the plunger causes the crank detent actuator to move to close the motor actuator switch.

17. The assembly of claim 16, the cradle including a front panel, the racking mechanism further including a manual position indicator that indicates in which of the plurality of positions the circuit breaker is via the front panel, a portion of the plunger extending underneath a portion of the manual position indicator.

18. An assembly for remotely racking a circuit breaker into and out of electrical switchgear, comprising:
  a cradle that houses a racking mechanism for racking a circuit breaker into and out of electrical switchgear, the cradle including a front panel accessible from a front of the cradle, the racking mechanism including a motor fixed inside the cradle and coupled to a drive member that turns a rotating member, which drives the racking mechanism causing the circuit breaker to be racked into or out of the switchgear among a plurality of positions that includes a connected position in which primary connectors of the circuit breaker are electrically connected to corresponding primary connectors of the cradle and a remove position in which the primary connectors of the circuit breaker are electrically disconnected from the corresponding primary connectors of the cradle;
  a wireless receiver module coupled to a solenoid, the wireless receiver module controlling actuation of the solenoid and being configured to, responsive to receiving an indication wirelessly from a remote transmitter module, cause the solenoid to actuate and thereby move a crank detent actuator coupled to the solenoid, the movement of the crank detent actuator closing a motor actuator switch, which causes the motor to cause the drive member to turn; and
  a plurality of indicator lights on the front panel for indicating which of the plurality of positions the circuit breaker is in.

19. An assembly for racking a circuit breaker into and out of electrical switchgear, comprising:
  a cradle that houses a racking mechanism for racking a circuit breaker into and out of electrical switchgear, the racking mechanism including a motor fixed inside the cradle and coupled to a drive member that turns a control screw, which drives the racking mechanism causing the circuit breaker to be racked into or out of the switchgear among a plurality of positions,
  wherein the solenoid is coupled to a crank detent actuator, wherein the solenoid causes the crank detent actuator to move and close a motor actuator switch, causing the motor to cause the drive member to turn.

20. The assembly of claim 19, wherein the plurality of positions includes a connected position, a remove position, and a test position that is intermediate the connected and remove positions, the assembly further comprising:
  a first switch positioned to be actuated in response to the circuit breaker being racked in the connected position;
  a second switch positioned to be actuated in response to the circuit breaker being racked in the test position; and
  a third switch positioned to be actuated in response to the circuit breaker being racked in the remove position, wherein actuation of any of the first, second, or third switches causes the motor to be turned off.

21. The assembly of claim 19, wherein the cradle includes a front panel, the assembly further comprising a plurality of indicator lights on the front panel for indicating in which of the plurality of positions the circuit breaker is.

22. The assembly of claim 19, wherein the crank detent actuator is coupled to a button arm that protrudes through a front panel of the cradle, the button arm and the crank detent actuator being arranged such that depression of the button arm causes the crank detent actuator to close the motor actuator switch.

23. An assembly for racking a circuit breaker into and out of electrical switchgear, comprising:
  a cradle that houses a racking mechanism for racking a circuit breaker into and out of electrical switchgear, the racking mechanism including a motor fixed inside the cradle and coupled to a drive member that turns a control screw, which drives the racking mechanism causing the circuit breaker to be racked into or out of the switchgear among a plurality of positions,
  wherein the cradle includes a front panel, the assembly further comprising a plurality of indicator lights on the front panel for indicating in which of the plurality of positions the circuit breaker is.

24. The assembly of claim 23, wherein the plurality of positions includes a connected position, a remove position, and a test position that is intermediate the connected and remove positions, the assembly further comprising:
  a first switch positioned to be actuated in response to the circuit breaker being racked in the connected position;
  a second switch positioned to be actuated in response to the circuit breaker being racked in the test position; and
  a third switch positioned to be actuated in response to the circuit breaker being racked in the remove position, wherein actuation of any of the first, second, or third switches causes the motor to be turned off.

25. The assembly of claim 23, wherein the solenoid is coupled to a crank detent actuator, wherein the solenoid causes the crank detent actuator to move and close a motor actuator switch, causing the motor to cause the drive member to turn.

26. The assembly of claim 25, wherein the crank detent actuator is coupled to a button arm that protrudes through a front panel of the cradle, the button arm and the crank detent actuator being arranged such that depression of the button arm causes the crank detent actuator to close the motor actuator switch.

27. The assembly of claim 25, further comprising a wirelessly controlled solenoid for causing the circuit breaker to move among the plurality of positions within the switchgear.

* * * * *